United States Patent
Nishiyama

(10) Patent No.: US 6,615,579 B2
(45) Date of Patent: Sep. 9, 2003

(54) EXHAUST GAS PURIFICATION SYSTEM FOR INTERNAL COMBUSTION ENGINE

(75) Inventor: Toshihiko Nishiyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/062,477

(22) Filed: Feb. 5, 2002

(65) Prior Publication Data

US 2002/0104311 A1 Aug. 8, 2002

(30) Foreign Application Priority Data

Feb. 7, 2001 (JP) ........................................ 2001-031239

(51) Int. Cl.[7] ................................................. F01N 3/00
(52) U.S. Cl. ............................. 60/285; 60/278; 60/280; 60/289; 60/290; 60/297
(58) Field of Search .......................... 60/274, 285, 276, 60/286, 295, 297, 301, 278, 289, 290, 280

(56) References Cited

U.S. PATENT DOCUMENTS

| | | | |
|---|---|---|---|
| 5,437,153 A | * | 8/1995 | Takeshima et al. ............ 60/276 |
| 5,894,725 A | * | 4/1999 | Cullen et al. .................. 60/274 |
| 6,161,378 A | * | 12/2000 | Hanaoka et al. ............... 60/286 |
| 6,209,316 B1 | * | 4/2001 | Duvinage et al. .............. 60/274 |
| 6,367,246 B1 | * | 4/2002 | Hirota et al. .................. 60/295 |
| 6,383,267 B1 | * | 5/2002 | Takaku et al. ................. 96/111 |

FOREIGN PATENT DOCUMENTS

JP     2586739     12/1996

* cited by examiner

Primary Examiner—Thomas Denion
Assistant Examiner—Binh Tran
(74) Attorney, Agent, or Firm—Armstrong, Westerman & Hattori, LLP

(57) ABSTRACT

An exhaust gas purification system is provided with a first air fuel ratio controller which, when the amount of NOx deposited on an NOx adsorber catalyst reaches a predetermined level, alters an air fuel ratio of exhaust gas from a diesel engine to come into contact with the NOx adsorber catalyst, so as to cause the NOx adsorber catalyst to release NOx deposited thereupon; and with a device for setting a reference NOx level in accordance with a load of the diesel engine so that when the engine runs in a high load range, it is possible to reduce the frequent recourse to running at about stoichiometric air fuel ratio, by setting a reference level to a considerably high level, and to thereby restrict deterioration of the engine and rate of fuel consumption of the diesel engine to a least possible limit.

18 Claims, 6 Drawing Sheets

EXHAUST GAS PURIFICATION SYSTEM FOR INTERNAL COMBUSTION ENGINE

BACKGROUND OF THE INVENTION

1. Field of the Invention

The present invention relates to an exhaust gas purification system for an internal combustion engine, more specifically to an exhaust gas purification system for an internal combustion engine comprising an NOx (Nitrogen Oxide) adsorber catalyst which absorbs NOx when exhaust gas inflow is lean in its air fuel ratio, and releases NOx when the concentration of oxygen of exhaust gas inflow becomes low.

2. Description of Related Art

It has been conventionally known, to lessen the content of NOx in exhaust gas discharged from an internal combustion engine (e.g., diesel engine), an exhaust gas purification system is introduced in connection with the internal combustion engine.

The exhaust gas purification system comprises a NOx adsorber catalyst which absorbs NOx when exhaust gas inflow is lean in its air fuel ratio, and releases NOx when the concentration of oxygen of exhaust gas inflow becomes low, the NOx adsorber catalyst being placed in an exhaust passage from the internal combustion engine.

The exhaust gas purification system includes one proposed in the Japanese Patent Publication No. 2586739.

This exhaust gas purification system comprises an NOx adsorber catalyst as above; an NOx mass estimating means for estimating the mass of NOx absorbed by the NOx adsorber catalyst; and a release means which, whenever the mass of NOx the estimating means estimates to be absorbed by the NOx adsorber catalyst exceeds a predetermined value, causes the NOx adsorber catalyst to release NOx. With this system, the release means causes the NOx adsorber catalyst to release NOx by lowering the oxygen concentration of exhaust gas inflow to be in contact with the NOx adsorber catalyst after having increased the supply of fuel to the cylinder of the internal combustion engine so as to make the engine run nearly on stoichiometric air fuel ratio.

According to the exhaust gas purification system as described above, whenever the NOx mass the NOx mass estimating means estimates to be absorbed by the NOx adsorber catalyst exceeds a predetermined value, the release means, regardless of the current load of the internal combustion engine, causes the NOx adsorber means to release NOx by increasing the fuel supply to the cylinder.

In other words, the release means increases the fuel supply to the cylinder as long as the same criterion is met, regardless of whether the engine works at a high load range or at a low load range.

However, when the internal combustion engine works at a high load range, the pressure within the cylinder (cylinder pressure) is high. Thus, if the amount of fuel supplied to the cylinder which is in such a sate as above is increased, the temperature within the cylinder will become considerably high. Because of this, if such an episodic increase of fuel supply to the cylinder is frequently repeated while the internal combustion engine runs in a high load range, it will encroach on the durability of the engine itself.

Particularly, if the internal combustion engine is equipped with a super charger, the amount of air supplied to the cylinder becomes so high that the temperature within the cylinder will be elevated which may further affect the durability of the engine. Moreover, then, the amount of air discharged from the cylinder will also become so high that, to keep the air fuel ratio close to stoichiometric value, a large amount of fuel must be supplied to the cylinder, which will lower the engine's rate of fuel consumption, and worsen the driving cost.

SUMMARY OF THE INVENTION

This invention has following features, in order to provide an exhaust gas purification system for an internal combustion engine by which it is possible not only to reduce the NOx content of exhaust gas, but also to restrict aggravation of the durability and the rate of fuel consumption of the internal combustion engine to a minimum limit.

In one aspect, this invention provides an exhaust gas purification system for an internal combustion engine being equipped with an NOx adsorber catalyst which absorbs NOx when an exhaust gas lean in the air fuel ratio flows in, and releases NOx when the oxygen concentration of exhaust gas inflow becomes low comprising an NOx mass estimating means for estimating the mass of NOx depositing in the NOx adsorber catalyst; a first air fuel ratio controlling means which, whenever the NOx deposition estimated by the NOx mass estimating means reaches a predetermined value (reference NOx level), causes the NOx adsorber catalyst to release NOx by altering the air fuel ratio of exhaust gas coming in contact with the NOx adsorber catalyst to a value close to stoichiometric one; and a reference NOx level varying means which varies the reference NOx level according to the load and engine speed (rate of revolution) of the internal combustion engine.

According to this invention, the first air fuel ratio controlling means changes the air fuel ratio of exhaust gas from the internal combustion engine to a value close to stoichiometric one, and lowers the concentration of oxygen of an exhaust gas coming in contact with the NOx adsorber catalyst, thereby causing the latter to release NOx. Specifically, the means in question causes the catalyst to release NOx deposited thereupon as N2 which contributes to the lowered concentration of NOx of exhaust gas.

The first air fuel ratio controlling means, whenever the NOx deposition (the amount of NOx accumulated in the NOx adsorber catalyst) estimated by the NOx mass estimating means reaches a predetermined value (reference NOx level), alters the air fuel ratio of an exhaust gas coming in contact with the NOx adsorber catalyst to a value close to stoichiometric one, and the reference NOx level is also varied by the reference NOx level varying means in accordance with the load of the internal combustion engine, or with the load and engine speed of the internal combustion engine. If, for example, the engine runs with a high load, or with a high load at a high engine speed, that is, the amounts of fuel and air supplied to a cylinder of internal combustion engine are high, the reference NOx level may be set high. Then, it will be possible to lessen the number of occasions in which the air fuel ratio of exhaust gas must be altered to a value close to stoichiometric one which would be otherwise required when the internal combustion engine works at a high load range. This will restrict aggravation of the rate of fuel consumption and durability of the internal combustion engine to a minimum limit.

With this invention, the reference NOx level setting means may preferably set the reference NOx level close to the maximum attainable level of NOx deposition for the NOx adsorber catalyst when the engine runs at a high speed in a high load range, while it may preferably set the reference NOx level at a level lower than the maximum attainable level of NOx deposition for the NOx adsorber catalyst when the engine runs at a low speed in a low load range.

According to this invention, when the internal combustion engine runs in a high load range where the engine would be impaired in its durability and rate of fuel consumption if recourse to the driving at about stoichiometric air fuel ratio were frequently introduced, the reference NOx level setting means sets the reference NOx level close to the maximum attainable level of NOx deposition for the NOx adsorber catalyst, and thus can reduce to a least possible limit such frequent recourse to the driving at about stoichiometric air fuel ratio, thereby restricting aggravation of the durability and rate of fuel consumption of the internal combustion engine to a minimum limit.

In contrast, when the engine runs in a low load range, the means in question sets the reference NOx level below the maximum attainable level of NOx deposition for the NOx adsorber catalyst, and thus allows the NOx adsorber catalyst to keep a room to accept the deposition of new NOx. Through this arrangement, the need for the immediate alteration of the reference NOx level to stoichiometric value can be effectively avoided, even when the engine's run shifts from a low load range to a high load range where emission of NOx is increased.

With this invention, the reference NOx level setting means may preferably set the reference NOx level to a level approximately equal to the maximum attainable level of NOx deposition for the NOx adsorber catalyst when the internal combustion engine runs at a high speed in a high load range, while the same means may preferably set the same level below the same maximum attainable level when the engine runs at a low speed in a low load range.

According to this invention, when the internal combustion engine runs at a high speed in a high load range where the engine would be seriously impaired in its durability and rate of fuel consumption if recourse to the driving at about stoichiometric air fuel ratio were frequently introduced, the reference NOx level setting means sets the reference NOx level close to the maximum attainable level of NOx deposition for the NOx adsorber catalyst, and thus can maintain at a least possible limit such frequent recourse to the driving at about stoichiometric air fuel ratio, thereby restricting aggravation of the durability and rate of fuel consumption of the internal combustion engine to a least possible limit.

In contrast, when the engine runs at a low speed in a low load range where frequent recourse to the driving at about stoichiometric air fuel ratio is less burdensome, the reference NOx level setting means sets the reference NOx level below the maximum attainable level of NOx deposition for the NOx adsorber catalyst, and thus allows the NOx adsorber catalyst to keep a room to accept the deposition of new NOx. Through this arrangement, the need for the immediate alteration of the reference NOx level to stoichiometric value can be effectively avoided, even when the engine's run changes from a low speed/low load range to another range including a high speed/high load range.

With this invention, when the engine runs in a low load range or in a low speed/low load range, it is preferable to set the reference NOx level appropriately depending on the current driving mode of the engine.

For example, if the driving mode consists of running the engine with a high load at one time and a low load at another at regular intervals, shifts from the low load driving to the high load driving and vice versa become more frequent and the duration at which the low load driving is maintained becomes shorter than are observed in a driving mode where the engine runs constantly in a low load range.

According to this invention, when the internal combustion engine runs in a low load range (or low speed/low load range), the reference NOx level setting means sets the reference NOx level appropriately in accordance with the current driving mode of the engine. Thus, for example, if the current driving mode consists of a series of brief running at a low load range (low speed/low load range), the reference NOx setting means sets the reference NOx level below a level which is usually introduced for the normal low load running, so as to cause the NOx adsorber catalyst to release NOx deposited thereupon at as low a level as possible. This will serve to maintain the frequency of recourse to the driving at about stoichiometric air fuel ratio whenever the engine enters into a high load range, at a least possible limit.

With this invention, when the engine runs in a low load range or in a low speed/low load range, the reference NOx level setting means may preferably set the reference NOx level at a level equal to one third to two thirds of the maximum NOx deposition attainable for the NOx adsorber catalyst.

According to this invention, when the internal combustion engine runs with a low load (in a low speed/low load range), the reference NOx level setting means sets the reference level at one third to two thirds of the maximum NOx deposition attainable for the NOx adsorber catalyst, and thus allows the NOx adsorber catalyst to keep a room sufficiently wide to accept new NOx equal in amount to the two thirds to one third of its maximum attainable NOx deposition. Through this setting, the need for the immediate alteration of the reference NOx level to stoichiometric value can be effectively avoided, even when the engine's run shifts from a low load range (or low speed/low load range) to a high load range (or to another range including a high speed/high load range).

With this invention, the system may preferably include a engine speed detecting sensor to detect the engine speed of the internal combustion engine, and a load detecting sensor to detect the load of the internal combustion engine, and the NOx mass calculating means may preferably calculate the mass of NOx deposited onto the NOx adsorber catalyst based on the information provided by the engine speed detecting sensor and load detecting sensor.

According to this invention, because the NOx mass calculating means calculates the NOx deposition on the NOx adsorber catalyst based on signals delivered from the engine speed detecting and load detecting sensors routinely attached to the internal combustion engine, need for the separate installment of an NOx sensor for determining the NOx deposition can be effectively avoided, which helps reduce the production cost of the exhaust gas purification system of this invention.

With this invention, preferably a second air fuel ratio controlling means may be introduced which causes the NOx adsorber catalyst to release NOx by altering the air fuel ratio of exhaust gas discharged from the internal combustion engine to come into contact with the NOx adsorber catalyst, immediately after the engine's run shifts from a high load range to a low load range, or from a high speed/high load range to a low speed/low load range.

According to this invention, whenever the engine's run shifts from a high load to a low load range, or a high speed/high load to a low speed/low load range, the second air fuel ratio controlling means alters the air fuel ratio of exhaust gas from the internal combustion engine close to stoichiometric value.

Because of this, whenever the engine's run shifts from a high load range (high speed/high load range) where the temperature/pressure within the cylinder as well as emission of NOx are high, to a low load range (low speed/low load range), the second air fuel ratio controlling means will ensure the release of NOx from the NOx adsorber catalyst, thereby securely lessening the NOx deposition on the catalyst no matter how much NOx has deposited thereupon. Therefore, even if the engine's run swiftly turns from the low load range back to a high load range, the original run may be continued for a while and the need for immediate recourse to the driving at about the theoretical air fuel ratio can be safely avoided.

With this invention, a air inflow restricting means may be introduced which is capable of restricting the inflow of air to the cylinder of the internal combustion engine, and the first and/or second air fuel ratio controlling means may preferably alter the air fuel ratio of exhaust gas from the engine to stoichiometric value by restricting air inflow to the cylinder via the air inflow restricting means.

According to this invention, because the air inflow restricting means capable of restricting the air inflow to the cylinder is introduced, it is possible to easily alter the air fuel ratio of exhaust gas. For example, if the air fuel ratio is in a lean range, the air inflow restricting means may be adjusted to lessen air inflow to the cylinder, which enables the air fuel ratio of exhaust gas to be close to stoichiometric value without seriously affecting the rate of fuel consumption of the engine.

With this invention, the internal combustion engine may preferably have a supercharger equipped with a compressor, and the air inflow restricting means may be configured in such a manner as to enable part of air accumulated on the compressor's outlet attached to the super charger to be vented towards the downstream of the NOx adsorber catalyst.

According to this invention, because the air inflow restricting means is introduced which is capable of diverting part of feed air accumulated on the compressor's outlet of super charger towards the downstream of the NOx adsorber catalyst, it is possible to ensure the driving at stoichiometric air fuel ratio without seriously affecting the rate of fuel consumption of the engine which would otherwise result when air inflow to the engine with a super charger is lessened with no proper care.

Further, because part of feed air is diverted to the downstream of the NOx adsorber catalyst under the feed pressure of the super charger, the part is securely exhausted without being reflected back.

With this invention, an operation monitoring means for monitoring the operation of the air inflow restricting means, and a fuel feed correcting means for correcting the amount of fuel fed to the cylinder of internal combustion engine based on a signal sent by the operation monitoring means may be preferably introduced.

According to this invention, operation of the air inflow restricting means is monitored by the operation monitoring means, and the amount of fuel fed to the cylinder is corrected based on a signal sent by the operation monitoring means. Through this arrangement, it is possible, when the air inflow restricting means is midway in operation for shifting the air fuel ratio from a lean range to about a theoretical level, or from about a theoretical level to a lean range, to adjust the amount of fuel fed to the cylinder in accordance with the current operation state, and thus to achieve the proper setting of the air fuel ratio even when the air inflow restricting means is midway in its operation.

DETAILED DESCRIPTION OF THE PREFERRED EMBODIMENT(S)

The preferred embodiment(s) of this invention will be described below with reference to the attached figures.

Figure 1:
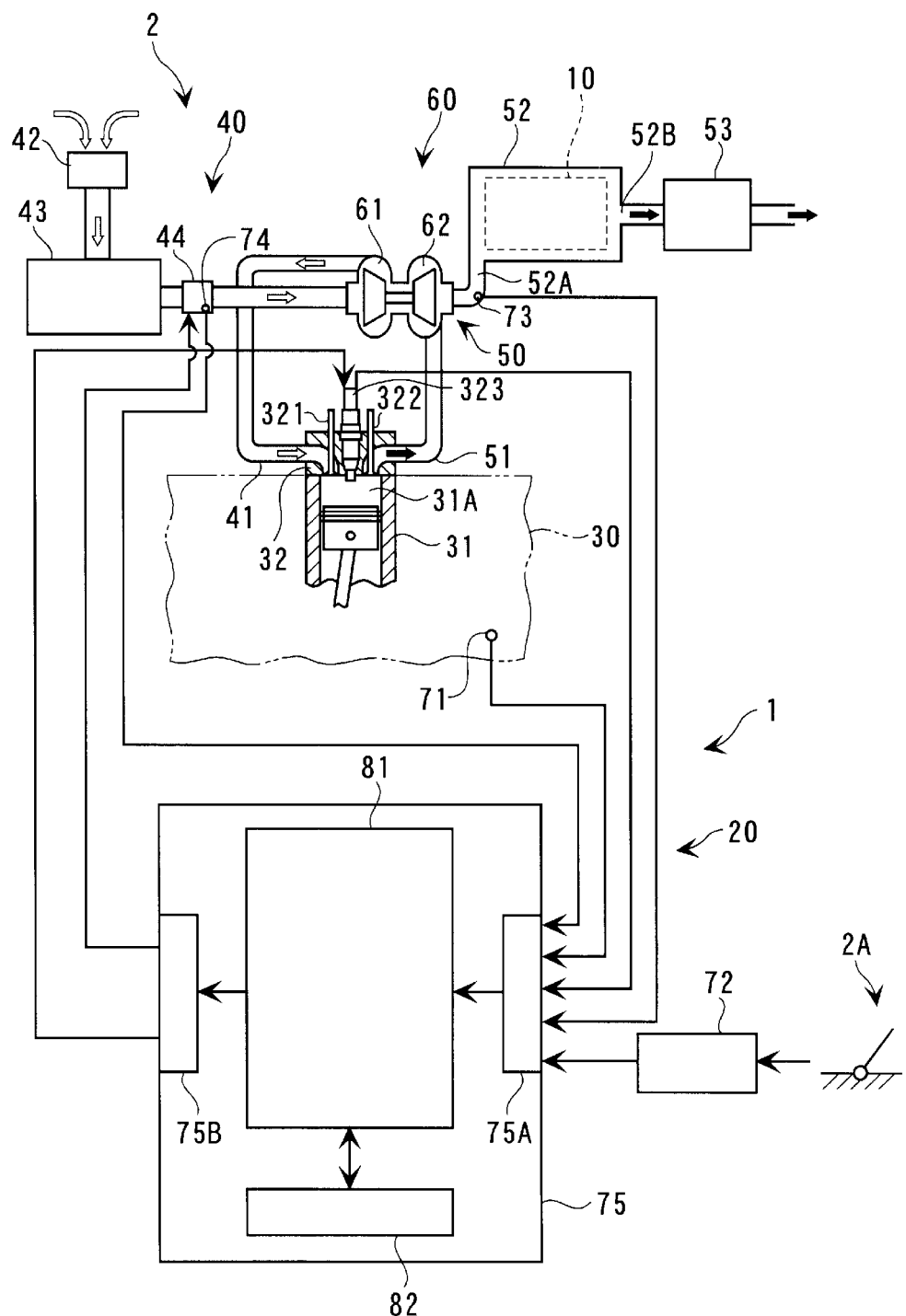
FIG. 1 is a diagram for outlining the configuration of a system representing an embodiment of this invention.

FIG. 1 shows a driving system of an embodiment of this invention. This system comprises an exhaust gas purification system I based on this invention, and a diesel engine 2 or one of internal combustion engines, to which the exhaust gas purification system is attached.

Firstly, the outline of the system will be given.

The exhaust gas purification system 1 comprises a NOx adsorber catalyst 10 placed in an exhaust passage of diesel engine 2, and a control means 20 for controlling the adsorption and release of NOx to and from the NOx adsorber catalyst 10.

The diesel engine 2 is one of internal combustion engines that generates a driving force by injecting a jet of fuel into a mass of air compressed to a high temperature, thereby achieving an automatic ignition, and comprises an engine body 30 equipped with a plurality of cylinders 31 (FIG. 1 shows only one cylinder 31 omitting the rest), an intake system 40 for taking air into the cylinder 31, an exhaust system 50 for discharging air from the cylinder 31, and a super charger equipped with a compressor 61 and a turbine 62. Out of these components, the exhaust system 50 contains the NOx adsorber catalyst 10 belonging to the exhaust gas purification system 1.

Next, the detail of the system will be given.

With regard to the body 30 of diesel engine 2, each cylinder 31 has on its top a cylinder head 32 which forms a top wall of a combustion chamber 31A within the cylinder 31, and to this cylinder head 32 are attached a air inflow valve 321 and a air outflow valve 322, and a fuel jet nozzle 323.

Each cylinder 31 is connected via the cylinder head 32 to an intake manifold 51 forming a component of the intake system 40, and to an exhaust manifold 51 forming a component of the exhaust system 50, and vertical back and forth movements of air inflow valves 321 and air outflow valves allow the cylinder 31 to let in and put out air therein and therefrom.

The fuel jet nozzle 323 is for injecting fuel pressurized by a fuel jet pump not illustrated here into the cylinder 31. The amount of fuel injected by the fuel jet nozzle 323 and the time required for the injection are determined by the activity of the fuel jet pump, and the activity of the fuel jet pump is controlled by a governor not illustrated here.

The air intake system 40 comprises a pre-cleaner 42, an air cleaner 43, and the aforementioned intake manifold 41.

The pre-cleaner 42 is connected to the upstream side of air cleaner 43; is introduced when the engine is supposedly incorporated in a car or machine which will be utilized in a tough work environment full of dusts (e.g., engine incorporated in a construction machine); and removes air taken in from outside of coarse dusts before the air enters into the air cleaner 43. Depending on the supposed work environment in which the diesel engine 2 will be utilized, the pre-cleaner may be dispensed with.

The air cleaner 43 is for removing air having passed the pre-cleaner 42 of debris and dusts, and its downstream side is connected via a pipe to the inlet of a compressor 61 attached to a super charger 60.

Midway of a pipe connecting the air cleaner 43 to the compressor 61 of super charger 60 there is a air inflow throttle 44 which serves as a air inflow restricting means of the exhaust gas purification system 1. This air inflow throttle 44 can control the air inflow to the cylinder 31 by, for example, adjusting the opening of the passage via the rotation of a disc not illustrated here. The manner how the air inflow throttle 44 works for the control will be detailed later.

The outlet of compressor 61 of super charger 60 is connected to the intake manifold 41 via a pipe, and the intake manifold 41 is connected via the cylinder head 32 to the cylinder 31.

The exhaust system 50 comprises an exhaust manifold 51, a catalyst housing 52, and an exhaust muffler 53.

The exhaust manifold 51 connected via the cylinder head to the cylinder 31 is connected via a pipe to the inlet of a turbine 62 of the super charger 60. The outlet of this turbine is connected via a pipe to the inlet of the catalyst housing 52, and to the outlet of catalyst housing 52 is connected the exhaust muffler 53.

The catalyst housing 52 contains a NOx adsorber catalyst 10 forming a component of the exhaust gas purification system 1 in its interior, and thus exhaust gas flowing in from an inlet 52A of catalyst housing 52 passes through the NOx adsorber catalyst 10 and exits from an outlet 52B.

The exhaust muffler 53 is implemented for suppressing the sound associated with exhaust gas passing through the NOx adsorber catalyst 10, and lowering the temperature of the exhaust gas.

Figure 2:
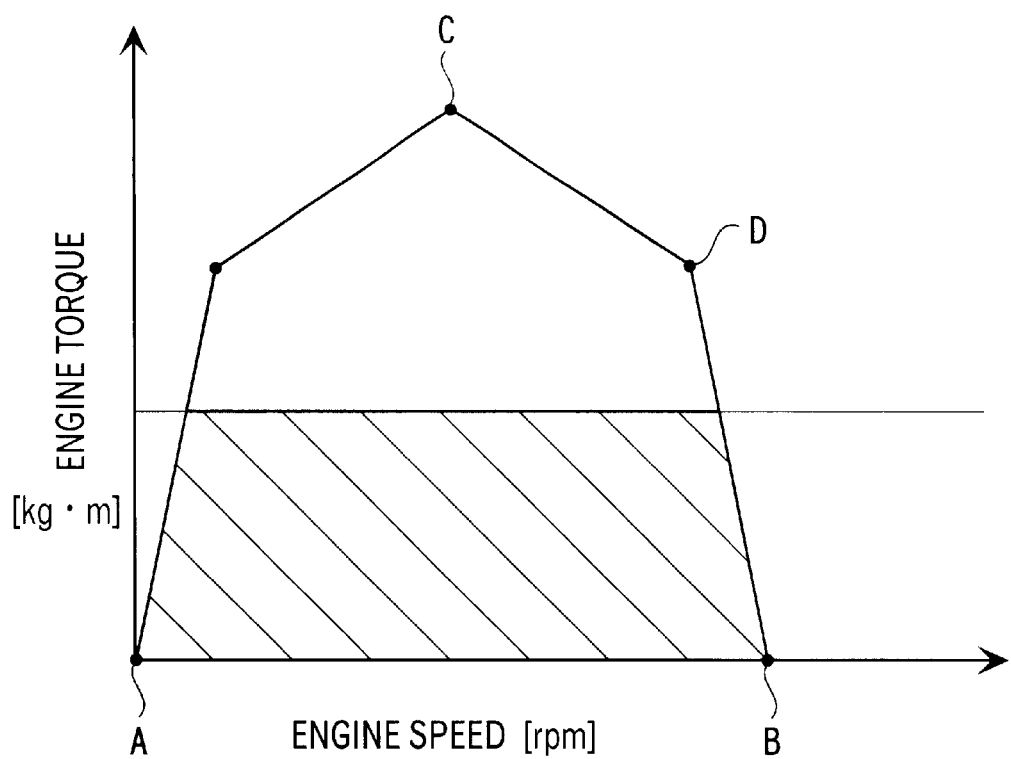
FIG. 2 is a graph representing an engine torque curve of a diesel engine of the above embodiment.

The engine torque curve of a diesel engine having a configuration as mentioned above is shown in FIG. 2. In the figure, the ordinate represents engine torque, while the abscissa engine speed.

With regard to the graph, point A represents the engine torque when the engine is at low idling; point B the same when the engine at high idling; point C when the engine runs with the maximum torque; and point D when the engine runs at the rated point.

In this embodiment, the low load range of diesel engine 2 is defined as an area covered by the curve and about 50% or less of the standard output (point D) (the range hatched in the figure). On the other hand, the high load range of diesel engine 2 is defined as an area covered by the curve and about 50% or more of the standard output. Namely, when the engine is at low idling (point A) or at high idling (point B), it is in a low load range, while when it runs with the highest torque (point C) or with a standard output (point D), it is in a high load range.

The NOx adsorber catalyst 10 forming a component of the exhaust gas purification system 1 is a catalyst which absorbs NOx when exhaust gas whose air fuel ratio is in a lean range flows in, and releases NOx deposited thereupon to discharge it as N2, when the oxygen concentration of air inflow is reduced, and is carried by a ceramic catalyst support having a honeycomb structure.

With this embodiment, adsorption and release of NOx to and from the NOx adsorber catalyst 10 of exhaust gas purification system 1 is achieved by controlling the air fuel ratio of air fed to the diesel engine 2, which is effected by a control means 20 described below forming another component of the exhaust gas purification system 1.

The control means 20 comprises various sensors 71 to 74 including a engine speed detection sensor 71, a load detection sensor 72, $O_2$ sensor 73, and throttle sensor 74 serving as an operation monitoring means, and a control system 75 which controls the air fuel ratio of air fed to the diesel engine based on signals delivered by the sensors 71 to 74.

The engine speed detection sensor 71 delivers a signal in correspondence with the engine speed (number) of a crankshaft (not illustrated) housed in the body of diesel engine 2, or of a fly wheel (not illustrated) attached to the crankshaft.

The load detection sensor 72 is for delivering a signal in correspondence with the step-in displacement of the accelerator pedal (accelerator aperture) 2A of diesel engine 2.

Incidentally, the engine speed detection sensor 71 and load detection sensor 72 are routinely attached to a diesel engine 2, and the use of such sensors makes it possible to construct an exhaust gas purification system 1 at a low cost.

The $O_2$ sensor 73 is for measuring the oxygen concentration of air close to the inlet 52A of catalyst housing 52, and for delivering a signal in correspondence with the measured concentration.

The flow throttle sensor 74 is for delivering a signal in correspondence with the aperture of the air inflow throttle 44.

The control system 75 comprises an input portion 75A for receiving signals from those various sensors 71 to 74; a computing portion 81 for making a computation based on a signal from the input portion 75A; a memory portion 82 to store information necessary for the computation executed by the computing portion 81; and an output portion 75B to deliver a signal from the computing portion to outside.

To the input portion 75A is fed a signal from the governor of diesel engine 2, in addition to the signals from those various sensors 71 to 74. The signal in question is delivered by the governor, depending on the information regarding the fuel supply to the cylinder 31 which is effected through the fuel jet nozzle 323.

Figure 3:
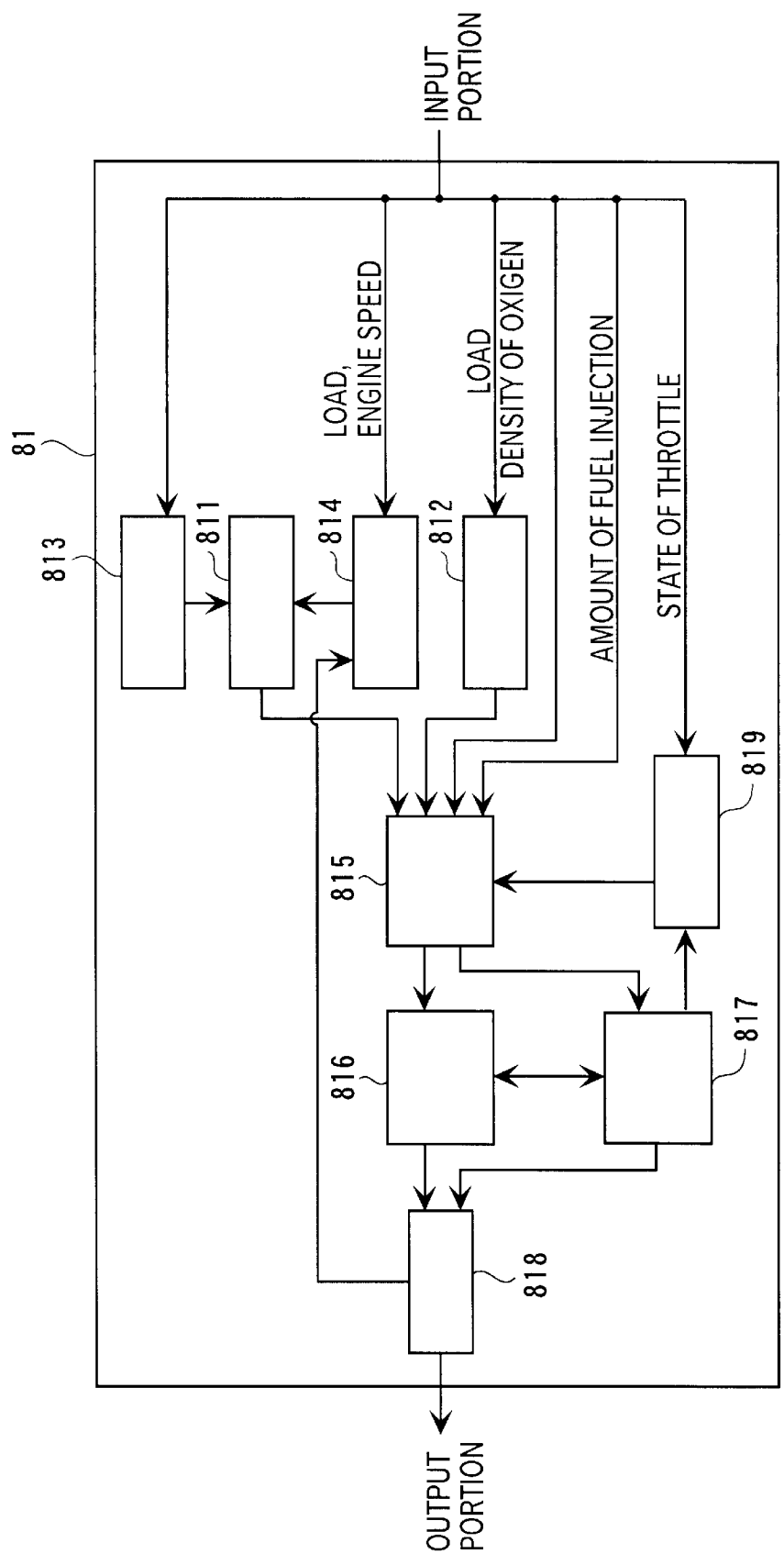
FIG. 3 is a block diagram for showing a computing portion of the above embodiment.

As shown in FIG. 3, the computing portion 81 comprises a first air fuel ratio controlling means 811 which delivers a signal instructing the diesel engine 2 to operate at about stoichiometric air fuel ratio whenever the amount of NOx deposited onto the NOx absorption catalyst reaches a predetermined level; a reference NOx level setting means 813 which sets the predetermined level which serves as a criterion by which the first air fuel ratio controlling means can determine whether it should deliver a signal or not; a second air fuel ratio controlling means 812 which delivers a signal instructing the diesel engine 2 to operate at about a theoretical air fuel ratio whenever the operation of diesel engine 2 shifts from a high load range to a low load range; an NOx deposition calculating means which calculates the deposition of NOx on the NOx adsorber catalyst; a air fuel ratio calculating means 815 which calculates the air fuel ratio of exhaust gas; an additional fuel supply/fuel injection time calculating means 816 which calculates the amount of additional fuel and the time required for the injection of the additional fuel in order to make the diesel engine 2 run on about a theoretical air fuel ratio; a air intake restriction amount/time calculating means 817 which calculates the amount of air intake and the time required for the intake in order to make the diesel engine 2 run on about a theoretical air fuel ratio; an instruction signal delivering means 818 which delivers an instruction signal to the diesel engine 2; and a fuel supply correcting means 819 which corrects the amount of fuel fed to the diesel engine 2 in accordance with the operation of the air intake throttle 44 attached to diesel engine 2.

Figure 4:
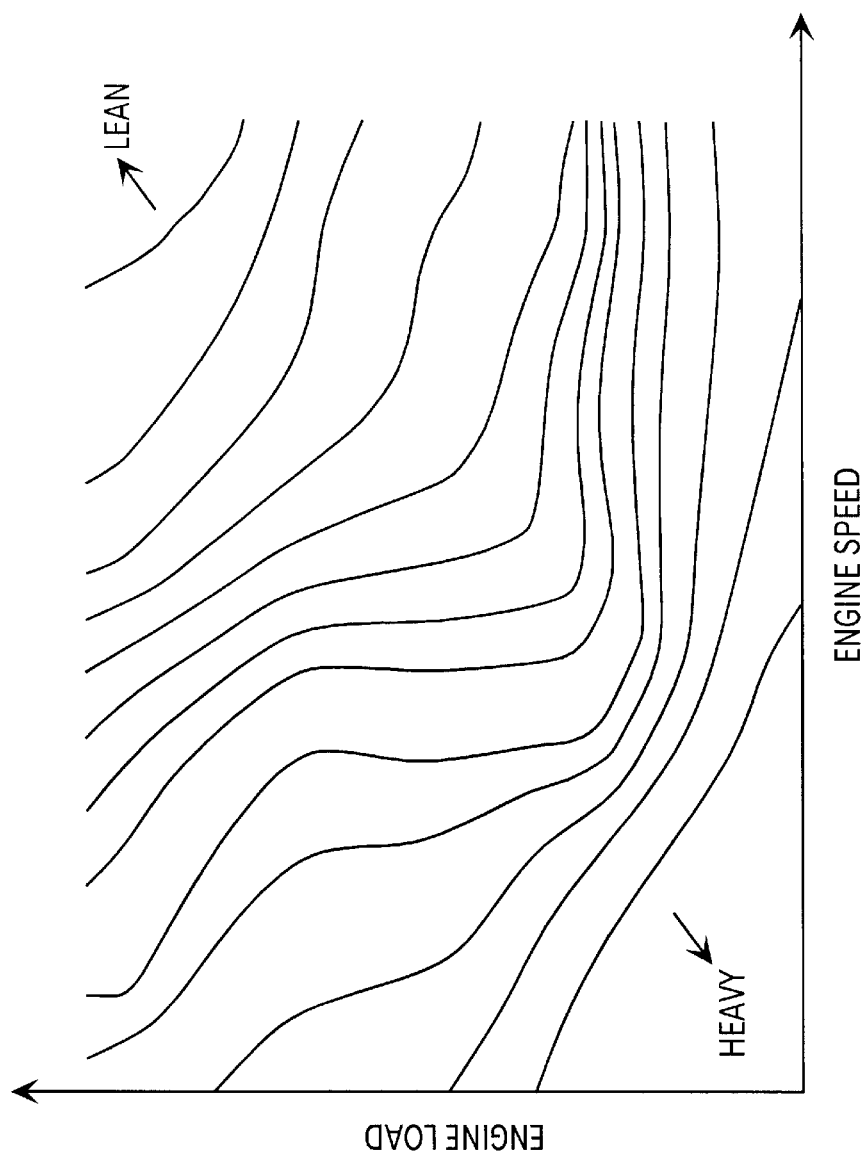
FIG. 4 is the NOx amount emitted by the diesel engine of the above embodiment expressed in weight per unit hour by unit horsepower.

The NOx deposition calculating means 814 calculates the amount of NOx deposited onto the NOx adsorber catalyst 10, based on input signals received from the engine speed detection sensor 71 and load detection sensor 72, and on the information derived from the graph of FIG. 4. In this embodiment, the amount of NOx deposited onto the NOx adsorber catalyst 10 is calculated by using the NOx amount discharged from diesel engine 2 and NOx conversion efficiency.

The graph of FIG. 4 represents relationship between the discharge amount of NOx per unit hour by unit horse power determined in an engine test on the diesel engine 2, engine load (ordinate), and engine rotating speed (abscissa), and each curve is obtained by connecting the same NOx discharge dots.

This embodiment is configured as follows: a graph like the one shown in FIG. 4 is stored as a sort of map in the memory portion 82 of the control system 75, and the NOx deposition calculating means, after having received signals from the engine speed detection sensor 71 and load detection sensor 72, determines the current engine speed and engine load (driving point), and then finds the discharge amount of NOx per unit hour by unit horse power based on the above results and by resorting to the graph of FIG. 4 in the form of a map.

Then, the NOx deposition means 814 calculates the hourly duration of the engine's run for each driving point using a timer not illustrated, to determine the discharge amount of NOx for the run, and sums the results for all the runs, to estimate the amount of NOx exhausted by diesel engine 2 to be deposited onto the NOx adsorber catalyst 10.

It should be noted, FIG. 4 is one example of graph representing the amount of NOx discharged by diesel engine 2 per unit hour by unit horse power, and the amount may vary depending on various conditions, e.g., on the presence of a super charger 60, or on the timing of fuel injection by the fuel jet nozzle 323.

The first air fuel ratio controlling means 811 is for altering the air fuel ratio of exhaust gas discharged by diesel engine 2 to be applied to the NOx adsorber catalyst 10, to about stoichiometric air fuel ratio, whenever the NOx deposition obtained via calculation by the NOx deposition calculating means 814 reaches a predetermined level set by the reference NOx level setting means 813, and this causes the NOx adsorber catalyst 10 to release NOx.

The reference NOx level setting means 813 sets the reference NOx level at a level (high load reference level hereinafter) close to the maximum NOx deposition permitted to the NOx adsorber catalyst 10 when diesel engine 2 runs in a high load range, while it sets the same at a level (low load reference level hereinafter) half the maximum NOx deposition when the engine runs in a low load range. The reference NOx level setting means 813 delivers, each time it alters the reference NOx level (set level), in other words each time the engine's run shifts from a high load range to a low load range or vice versa, the newly set level to the first air fuel ratio controlling means 811.

For this operation, the reference NOx level setting means 813 determines whether diesel engine 2 runs in a high load range or in a low load range, based on a signal from the load detection sensor 72, while the 50% value of the standard output (point D) of diesel engine 2 which serves as a criterion by which the means in question determines whether the engine is currently in a high load range or in a low load range is stored in the memory portion 82.

The first air fuel ratio controlling means 811 and reference NOx level setting means 813 are configured as above, and thus the first air fuel ratio controlling means monitors the NOx deposition onto the NOx adsorber catalyst 10, based on an input signal from the NOx deposition calculating means, and whenever it finds the NOx deposition reaches the reference NOx level obtained from the reference NOx level setting means, it delivers a signal to the air fuel ratio calculating means 815.

The second air fuel ratio controlling means 812 is for altering the air fuel ratio of exhaust gas discharged by diesel engine 2 to be applied to the NOx adsorber catalyst 10, to about stoichiometric air fuel ratio, whenever the engine's run shifts from a high load range to a low load range, and this causes the NOx adsorber catalyst 10 to release NOx.

The second air fuel ratio controlling means 812 is so configured as to be able to determine the time when the operation of diesel engine 2 shifts from a high load range to a low load range, based on an input signal from the load detection sensor 72: it determines the operation of diesel engine 2 shifts from a high load range to a low load range when it finds the current load changes from a value more than 50% of the standard output (point D) of diesel engine 2 to a value below that 50% value.

The second air fuel ratio controlling means 812, when it finds the operation of diesel engine 2 shifts from a high load range to a low load range, is so configured as to deliver a signal to the air fuel ratio calculating means 815.

On receipt of a signal from the first air fuel ratio controlling means 811 or from the second air fuel ratio controlling means 812, the air fuel ratio calculating means 815 calculates not only the amounts of air intake and fuel supply based on the information provided by $O_2$ sensor 73 regarding the oxygen concentration of exhaust gas, and on the information provided by the governor of diesel engine 2 regarding fuel supply, but also the air fuel ratio of exhaust gas from diesel engine 2 based on the foregoing calculation results. For this operation, the governor of diesel engine 2 determines the fuel injection from the period during which the valve of fuel injection nozzle 323 is opened and from the rack position of the fuel jet pump.

It should be noted, in this embodiment the air fuel ratio of exhaust gas is determined based on the information provided by the $O_2$ sensor 73 and the governor of diesel engine 2. However, determination of the air fuel ratio of exhaust gas may be achieved by installing an air fuel ratio sensor on a passage of exhaust gas.

The additional fuel supply/fuel injection time calculating means 816 compares the air fuel ratio provided by the air fuel ratio calculating means 815 with stoichiometric air fuel ratio, and determines, based on the comparison result and the current air intake and fuel supply provided by the air fuel ratio calculating means 815, the additional fuel supply necessary for bringing the current air fuel ratio of diesel engine 2 close to the theoretical air fuel ratio, and the fuel injection time necessary for releasing the entire amount of NOx deposited onto the NOx adsorber catalyst 10.

The air intake restriction amount/time calculating means 817 compares the air fuel ratio provided by the air fuel ratio calculating means 815 with stoichiometric air fuel ratio, and determines, based on the comparison result and the current air intake and fuel supply provided by the air fuel ratio calculating means 815, the air intake restriction amount necessary for bringing the current air fuel ratio of diesel engine 2 close to the theoretical air fuel ratio, and the fuel injection restriction time necessary for releasing the entire amount of NOx deposited onto the NOx adsorber catalyst.

During this operation, the additional fuel supply/fuel injection time calculating means 816 and air intake restriction amount/time calculating means 817 are adjusted to match with each other such that the additional fuel supply determined by the former and the air intake restriction determined by the latter, when summed, bring the current air fuel ratio close to the theoretical air fuel ratio, while keeping the change in output of diesel engine 2 at minimum.

The instruction signal delivering means 818, on receipt of a signal from the additional fuel supply/fuel injection time calculating means 816, delivers a signal to diesel engine 2 to instruct it to increase fuel to be fed to the cylinder 31. On receipt of a signal from air intake restriction amount/time calculating means 817, the same means delivers a signal to diesel engine 2 to instruct it to decrease fuel to be fed to the cylinder 31.

In this operation, the signal conveying an instruction for the increase of fuel fed to the cylinder 31 is delivered, for example, to the fuel jet pump which provides fuel to the fuel injection nozzle 323 after having pressurized it. The signal is sent to the pump via a governor, which is not illustrated here, responsible for the control of the fuel injection pump.

On the other hand, a signal conveying an instruction for reducing air fed to the cylinder 31 is delivered to the air intake throttle 44, and the air intake throttle 44, on receipt of the signal, will rotate a disc, thereby narrowing the opening of passage.

Because these instruction signals provided by the instruction signal delivering means 818 to diesel engine 2 cause the fuel supply to the cylinder 31 to increase, or the air intake to decrease, it is possible for the air fuel ratio of air fed to diesel engine 2 to switch from a lean range to about stoichiometric level.

The instruction signal delivering means 818 includes a timer not illustrated here, and the timer counts clock pulses during the fuel injection and/or air intake restriction, and, on completion of counting of assigned pulses, the instruction signal delivering means 818 delivers not only a signal to diesel engine 2 to instruct it to terminate its operation at a theoretical air fuel ratio, and adopt instead the operation at a lean air fuel ratio, but also a signal to the NOx deposition calculating means 814 to instruct it to reset the heretofore accumulated NOx amount.

The fuel supply correcting means 819, based on a signal from the throttle sensor 74 which serves as an operation monitoring means for monitoring the operation of air intake throttle 44, and on the air intake restriction amount provided by the air intake restriction amount/time calculating means 817, delivers a signal to diesel engine 2 to instruct it to correct the fuel supply to the cylinder 31.

To put it more specifically, the fuel supply correcting means 819 monitors the operation of air intake throttle 44 via a signal from the throttle sensor 74, and compares the operation of the air intake throttle 44 with the air intake restriction amount provided by the air intake restriction amount/time calculating means 817, and, when it finds the air intake restriction executed by the air intake throttle is too small, delivers to the air fuel ratio calculating means 815 a signal in accordance with the current restriction amount executed by the air intake throttle 44.

As a result of this, the air fuel ratio calculating means 815 renews the calculation of air intake, fuel supply and air fuel ratio, and the additional fuel supply/fuel injection time calculating means 816 calculates the additional fuel supply and fuel injection time based on these calculation results, and the instruction signal delivering means 818 delivers a signal anew.

Because the fuel supply correcting means 819 operates as described above, even when the air intake throttle 44 is midway in operation when the air fuel ratio under which diesel engine 2 operates is switched from a lean level to stoichiometric level or vice versa, it is possible to adjust the fuel supply to the cylinder 31 in accordance with the current operation state, thereby enabling the proper adjustment of the air fuel ratio.

Next, operation of the system under study in this embodiment will be described below.

When diesel engine 2 is in a low load range, e.g., runs at a low speed, or is in a low or high idling state, the reference NOx level setting means determines a reference NOx level appropriate for the low load range, and delivers a signal notifying the reference level to the first air fuel ratio controlling means 811; and the first air fuel ratio controlling means 811, when it finds the NOx deposition onto the NOx adsorber catalyst 10 reaches the reference NOx level appropriate for the low load range, delivers a signal to the air fuel ratio calculating means 815.

When the operation of diesel engine 2 shifts from a low load range to a high load range (the engine is accelerated, or runs at a high speed, or with a maximum torque or a standard output), the reference NOx level setting means 813 determines a reference NOx level appropriate for the high load range, and delivers a signal notifying the reference level to the first air fuel ratio controlling means 811; and the first air fuel ratio controlling means 811, when it finds the reference NOx level by which it determines whether it should deliver a signal or not changes from a level appropriate for a low load range to one for a high load range, and further the NOx deposition onto the NOx adsorber catalyst 10 reaches the reference NOx level appropriate for the high load range, delivers a signal to the air fuel ratio calculating means 815.

On the other hand, when the operation of diesel engine 2 shifts from a high load range to a low load range, the second air fuel ratio controlling means 812 delivers a signal to air fuel ratio controlling means 815. Further, the first air fuel ratio controlling means 811 returns the reference NOx level by which it determines whether it should deliver a signal or not, from one appropriate for a high load range to one for a low load range, in response to a signal from the reference NOx level setting means 813.

As seen above, whenever the first or second air fuel ratio calculating means 811 or 812 delivers a signal to the air fuel ratio calculating means 815, the fuel/air calculating means 815 calculates air amount, fuel supply and air fuel ratio of exhaust gas from diesel engine 2, and the calculation results are distributed to the additional fuel supply/fuel injection time calculating means 816 and the air intake restriction amount/time calculating means 817.

The additional fuel supply/fuel injection time calculating means 816 and the air intake restriction amount/time calculating means 817 calculate the additional fuel supply and fuel injection time, and the air intake and air intake time necessary for bringing the current air fuel ratio of diesel engine 2 to stoichiometric air fuel ratio, and the signals notifying the calculation results are delivered via the instruction signal delivering means 818 to the governor (not illustrated here) and air intake throttle 44.

Through this arrangement it is possible for the air fuel ratio under which diesel engine 2 operates to be switched from a lean level to the theoretical level. On completion of counting by the timer not illustrated here of the pulses assigned for fuel injection and/or air intake, the air fuel ratio under which diesel engine 2 operates is switched from the theoretical level to a lean level.

Further, when the air fuel ratio under which diesel engine 2 operates is switched from a lean level to a theoretical level, or vice versa, and the fuel supply correcting means 819 finds, by way of the throttle sensor 74, the air intake throttle 44 is delayed in operation, the latter delivers to the air fuel ratio calculating means 815 a signal in accordance with the current restriction amount executed by the air intake throttle 44.

As a result of this, the air fuel ratio calculating means 815 renews the calculation of air intake, fuel supply and air fuel ratio, and the additional fuel supply/fuel injection time calculating means 816 calculates the additional fuel supply and fuel injection time based on these calculation results. Then, the instruction signal delivering means 818 delivers a signal anew based on these calculation results to the governor so that the fuel amount injected via the fuel jet nozzle 323 and fuel injection time may be corrected.

According to this embodiment as described above, following advantages will be ensured.

(1) With the control system 75 of exhaust gas purification system 1, the first air fuel ratio controlling means 811 alters the air fuel ratio of exhaust gas from diesel engine 2 to stoichiometric level whenever the NOx deposition (the amount of NOx accumulated in the NOx adsorber catalyst 10) determined by the NOx deposition calculating means 814 reaches a reference NOx level, and the reference NOx level which serves as a criterion for the alteration of air fuel ratio, is determined by the reference NOx setting means 813 in accordance with the current load of diesel engine 2.

When diesel engine 2 runs in a high load range where frequent recourse to the driving at about a theoretical air fuel ratio may deteriorate the durability and rate of fuel consumption of the engine, it is possible to minimize the frequency of recourse to the driving at a theoretical air fuel ratio because the reference NOx level setting means 813 sets a reference NOx level (reference NOx level for high load range) close to the maximum NOx deposition attainable for the NOx adsorber catalyst 10, and therefore to restrict aggravation of the durability and rate of fuel consumption of diesel engine 2 to a least possible limit.

Further, when the engine runs in a low load range, the reference NOx level setting means 813 sets a reference NOx level below the maximum NOx deposition attainable for the NOx adsorber catalyst 10, and thus allows the NOx adsorber catalyst 10 to keep a room to accept the deposition of new NOx. Through this arrangement, the need for the immediate alteration of the reference NOx level to stoichiometric value can be effectively avoided, even when the engine shifts from a low load range to a high load range where emission of NOx is increased.

(2) Because the NOx deposition calculating means 814 determines the NOx deposition onto the NOx adsorber catalyst 10, based on input signals from the engine speed detection sensor 71 and load detection sensor 72, the need for deliberate installment of a separate NOx sensor for determining the NOx deposition can be effectively avoided, which will enable the low cost production of this exhaust gas purification system 1.

(3) Because the reference NOx level setting means 813 sets a reference NOx level at about half the maximum NOx deposition attainable for the NOx adsorber catalyst 10 whenever diesel engine 2 runs with a low load, it is possible for the NOx adsorber catalyst 10 to keep a room sufficiently wide for accepting as much as half the maximum deposition of NOx. Through this arrangement, the need for the immediate alteration of the reference NOx level to stoichiometric value can be effectively avoided, even when the engine's run shifts from a low load range to a high load range.

(4) The second air fuel ratio controlling means 812 alters the air fuel ratio of exhaust gas from diesel engine 2 close to a theoretical level, whenever the operation of diesel engine 2 shifts from a high load range to a low load range. Because of this, even when the engine's run shifts from a high load range where the temperature and pressure within the cylinder 31 are so high that emission of NOx is increased, to a low load range, and thus even when the amount of NOx deposited onto the NOx adsorber catalyst 10 is high, the second air fuel ratio controlling means 812 can securely enable the NOx adsorber catalyst 10 to readily release NOx, and thus it is possible even when the engine's run shifts from the low load range to a high load range, to keep the last run for a while and to avoid the necessity for immediate alteration of the current air fuel ratio to about the theoretical level.

(5) Because the air intake throttle 44 is introduced which is capable of restricting the air inflow to the cylinder 31, it is possible to readily alter its air fuel ratio. Through this arrangement it is possible when the current air fuel ratio is in a lean range to reduce the air inflow to the cylinder 31 via the air intake restricting means 44, thereby enabling diesel engine 2 to run at a theoretical air fuel ratio without greatly affecting its rate of fuel consumption.

(6) The throttle sensor 74 monitors operation of the air intake throttle 44, and the fuel supply correcting means 819 corrects the fuel supply to the cylinder 31 based on a signal from the throttle sensor 74. Because of this, even when the air intake throttle 44 is midway in operation when the air fuel ratio under which diesel engine 2 operates is switched from a lean level to stoichiometric level or vice versa, it is possible to adjust the fuel supply to the cylinder 31 in accordance with the current operation state, thereby enabling the proper adjustment of the air fuel ratio.

It should be noted that this invention is not limited to the above embodiment, but includes all the modified versions and improvements, as long as they are introduced to attain the object of this invention.

For example, the above embodiment only includes the air intake throttle 44 for restricting the air inflow to the cylinder 31 of diesel engine 2, but the air intake restricting means is not limited to the above, but may include any means as long as they are capable of restricting the air inflow to the cylinder of internal combustion engine.

Figure 5:
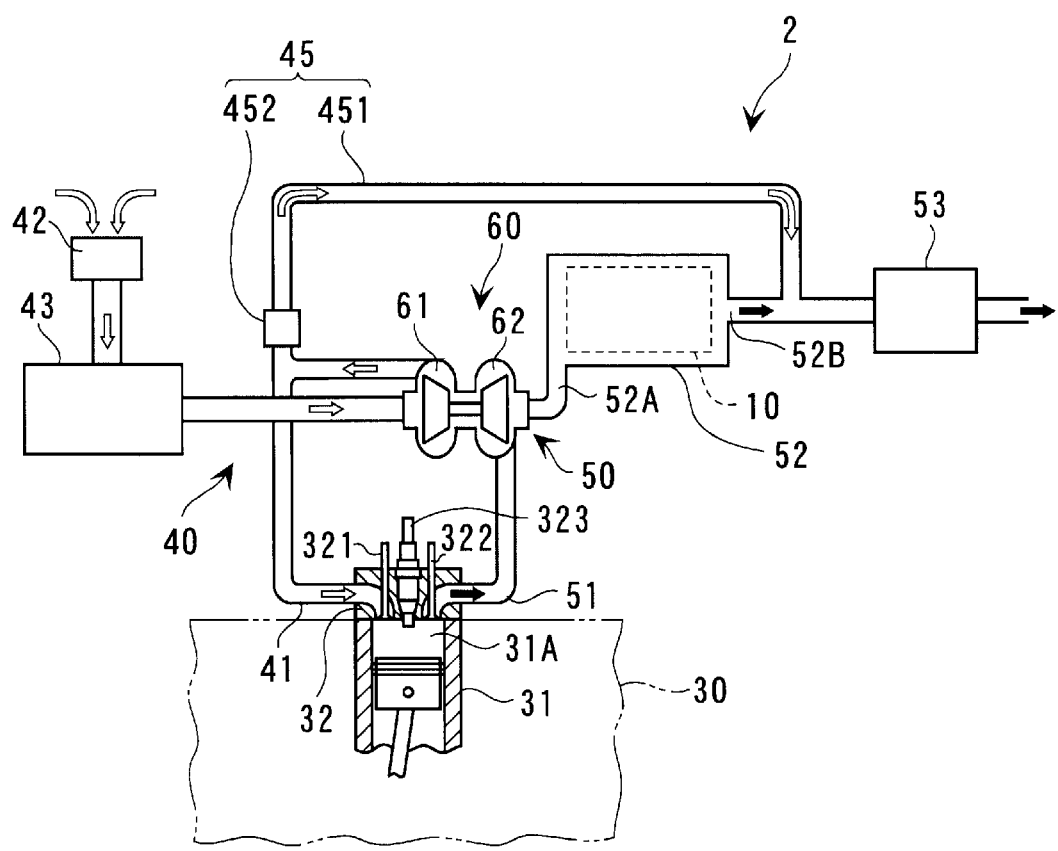
FIG. 5 is a diagram for outlining the configuration of a modified version of this invention with a focus on its parts of interest.

Referring to FIG. 5 now, the air intake restricting means 45 comprises an exhaust channel 451 for emitting part of feed air supplied via the outlet of compressor 61 of super charger 60 to the downstream side of NOx adsorber catalyst 10, and a throttle 452 which is placed midway on the exhaust channel 451 to adjust its opening.

With the air intake restricting means 45 configured as above, opening the throttle 452 causes part of feed air supplied via the outlet of compressor 61 of super charger 60 to be expelled via the exhaust channel 451 to the downstream side of the NOx adsorber catalyst 10. This makes it possible to restrict the air inflow to the cylinder 31 of diesel engine 2 and thus to allow the diesel engine 2 to run at about stoichiometric air fuel ratio. Incidentally, the adjustment by the air intake restricting means 45 of the opening of throttle 452 may be achieved in the opposite manner as in the adjustment of the opening of air intake restricting means 44 of the above embodiment.

Provided that such a air intake restricting means 45 is implemented, it is possible to ensure diesel engine 2 with the super charger 60 to run at about a theoretical air fuel ratio without deteriorating its rate of fuel consumption which would otherwise result from the lessened air inflow. Further, because expelling part of fed air to the downstream side of the NOx adsorber catalyst 10 occurs by the use of a feed pressure provided by the super charger 60, the air is securely expelled without showing any counter current.

Throughout the description of the above embodiment, it is assumed that the reference NOx level which the first air fuel ratio controlling means 811 uses as a criterion for determining whether a signal should be delivered or not, when diesel engine 2 runs in a low load range, is set at a level half the maximum NOx deposition attainable for the NOx adsorber catalyst 10, but the level in question may be altered as appropriate depending on the driving mode of diesel engine 2. Incidentally, the driving mode includes various types, e.g., driving modes encountered with general vehicles, construction machine movers (work mode), etc.

Figure 6:
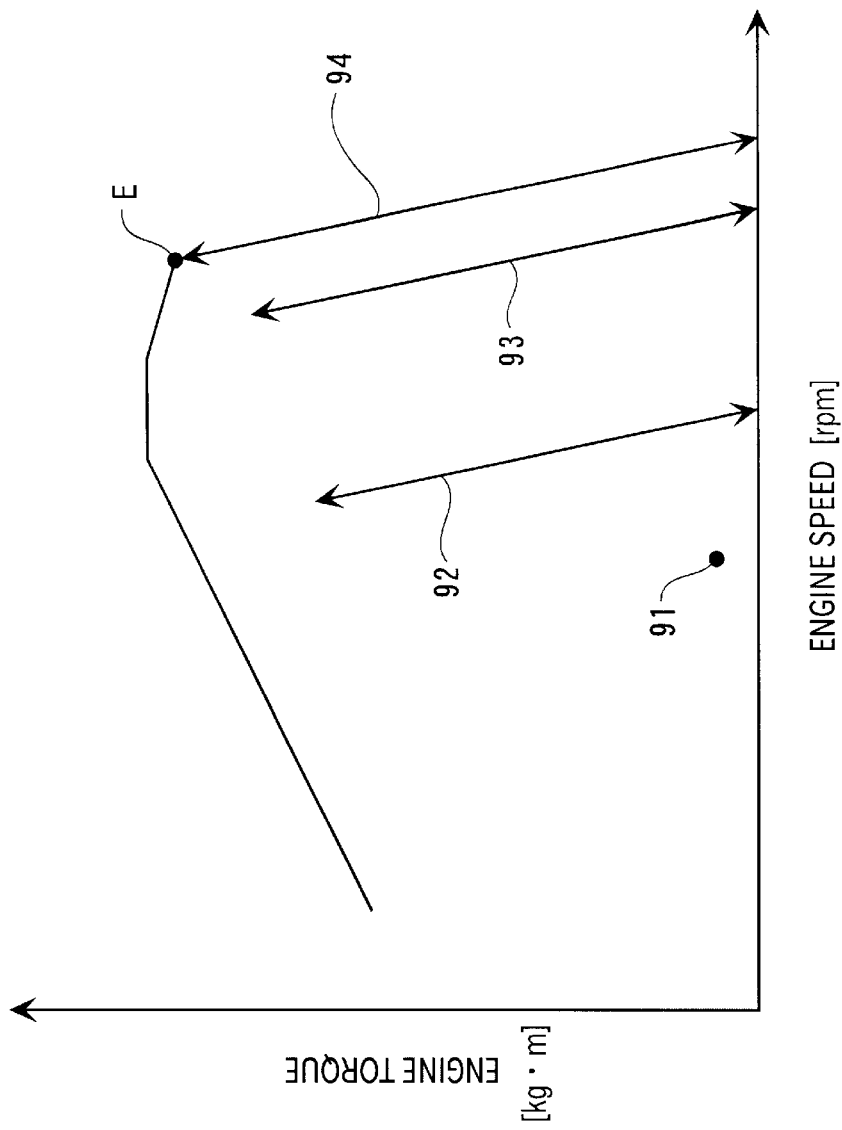
FIG. 6 is a graph for showing the operation of the modified version of this invention.

Referring to FIG. 6 now, this shows an engine torque curve of a diesel engine for a hydraulic shovel. With reference to this figure, the work mode of the hydraulic shovel will be described. Of this coordinate, the ordinate represents engine torque and the abscissa engine speed.

In FIG. 6, point E represents a standard output; 91 defines the engine torque and engine speed when the shovel is at rest; and 92 to 94 various types of work mode based on the use of shovel, i.e., 92 represents a minor operation mode, 93 digging/breaker mode related with ordinary digging or the use of a breaker, and 94 heavy digging mode. These work modes 92 to 94 are chosen appropriately depending on the current work done by the hydraulic shovel, and switching from one mode to another may be achieved via switches prepared, for example, near a driver's seat.

Of these work modes 92 to 94, the digging/breaker mode 93 and heavy digging mode 94 consists of a driving mode (work mode) where switching between a driving at a high speed with a low load and a driving at a low speed with a high load is repeated at regular intervals. In contrast with these three work modes 93, 94, the minor operation mode 92 is a driving mode consisting of a driving at a relatively low engine speed under a relatively low load.

When the digging/breaker mode 93 or heavy digging mode 94 is adopted, switching the driving from a low load range to a high load range and vice versa becomes frequent, and the time spent for driving at a low load range becomes short, as compared with the driving mode where the driving consists of a constant run in a low load range. If, in the driving mode 93 or 94, the reference NOx level setting means 813 sets a reference NOx level below the level normally set for the run at a low load range (half the maximum NOx deposition attainable for the NOx adsorber catalyst 10 for the foregoing embodiment), or, for example, at a level about one third the maximum NOx deposition, it will be possible to restrict the frequency of recourse to the run at a theoretical air fuel ratio for a high load range to a least possible limit, because then the load level at which the release of NOx deposited onto the NOx adsorber catalyst 10 occurs will be kept as low as possible.

In the foregoing embodiment, when diesel engine 2 runs in a low load range, the reference NOx level by which the first air fuel ratio controlling means 811 determines whether it should deliver a signal or not, is set by the reference NOx level setting means 813 to a level half the maximum NOx deposition attainable for the NOx adsorber catalyst 10. However, the level at which the reference level should be set is not limited to half the maximum NOx deposition, but may take any value, as long as the value is included between one third and two thirds of the maximum NOx deposition. Thus, the reference level may be chosen from the above range appropriately depending on the NOx absorption capacity of the catalyst, and the NOx output from diesel engine 2.

The foregoing embodiment comprises the throttle sensor 74 for monitoring operation of the air intake throttle 44, and the fuel supply correcting means 819 for delivering, based on an input signal from the throttle sensor 74, a signal for correcting the fuel supply to the cylinder 31 of diesel engine 2. However, the throttle sensor 74 and fuel supply correcting means 819 are not necessarily added, and the system lacking those means is also included in this invention. In the foregoing embodiment, the second air fuel ratio controlling means 812 is provided which delivers a signal to diesel engine 2 to cause it to make a run at about a theoretical air fuel ratio when the engine's run shifts from a high load range to a low load range, but a second air fuel ratio controlling means such as this may not be necessarily added, and the system lacking such a means is also included in this invention.

In the foregoing embodiment, the NOx deposition calculating means 814 determines the NOx deposition onto the NOx adsorber catalyst 10 based on signals from engine speed detection sensor 71 and load detection sensor 72. However, the NOx deposition calculating means 814 may determine the NOx deposition based on a signal from an NOx sensor which is placed close to the inlet 52A of catalyst housing 52, for determining the NOx concentration there.

The reference NOx level setting means 813 of the foregoing embodiment determines a reference NOx level depending on whether diesel engine 2 is in a high load range or in a low load range. However, the reference NOx level setting means 813 according to this invention is not limited to what is described above, and may determine a reference NOx level depending on whether diesel engine 2 is in a high speed/load range or in a low speed/load range. In the latter case, the reference NOx level setting means determines whether diesel engine 2 is currently in a high speed/load range or in a low speed/load range, based on input signals from the engine speed detection sensor 71 and load detection sensor 72.

Even in a high speed/load range in which frequent recourse to the driving at about a theoretical air fuel ratio may seriously deteriorate the durability and rate of fuel consumption of diesel engine 2, if the reference NOx setting means sets a reference NOx level approximately equal to the maximum NOx deposition attainable for the NOx adsorber catalyst 10, it is possible to reduce the number of necessary recourses to the driving at about a theoretical air fuel ratio as much as possible, thereby restricting deterioration of the durability of diesel engine 2 and its rate of fuel consumption to a least possible limit.

In a low speed/load range in which frequent alteration to the driving at about a theoretical air fuel ratio may not be so burdensome as in a high speed/load range, if the reference NOx setting means sets a reference NOx level below the maximum NOx deposition attainable for the NOx adsorber catalyst 10, it is possible to allow the NOx adsorber catalyst 10 to keep a room to accept the deposition of new NOx. Through this arrangement, even when the engine's run shifts from a low load range to another load range including a high speed/load range, the need for the immediate alteration of the reference NOx level to stoichiometric value as soon as the new load range sets in can be effectively avoided.

According to the foregoing embodiment, the computing portion 81 of the exhaust gas purification system 1 comprises both the additional fuel supply/fuel injection time calculating means 816 and the air intake restriction amount/time calculating means 817 in its computing portion 81, and the system allows the engine to run at about a theoretical air fuel ratio by adjusting the fuel supply to the cylinder 31 of diesel engine 2 and the air intake. However, the system may allow the engine to run at about a theoretical air fuel ratio by comprising only the additional fuel supply/fuel injection time calculating means 816, and by adjusting therewith only the fuel supply to the cylinder 31. Alternatively, the system may allow the engine to run at about a theoretical air fuel ratio by comprising only the air intake restriction amount/time calculating means 817, and by adjusting therewith only the air inflow to the cylinder 31.

According to the foregoing embodiments, the exhaust gas purification system 1 is installed in a diesel engine 2. However, the system may be installed in the internal combustion engine including gasoline engines.

What is claimed is:

1. An exhaust gas purification system for an internal combustion engine equipped with an NOx adsorber catalyst which absorbs, for deposition, NOx when exhaust gas lean in its air fuel ratio flows in, and releases deposited NOx when an oxygen concentration of exhaust gas inflow is reduced, comprising:
   a NOx deposition calculating means for calculating the amount of NOx deposited on the NOx adsorber catalyst;
   a first air fuel ratio controlling means which, when the NOx deposition calculated by the NOx deposition calculating means reaches a predetermined reference level, alters an air fuel ratio of exhaust gas discharged from the internal combustion engine to come into contact with the NOx adsorber catalyst to stoichiometric air fuel ratio, so as to cause the NOx adsorber catalyst to release NOx deposited thereupon; and
   a reference NOx level setting means which changes a reference NOx level in accordance with a driving condition defined by a load range with which the internal combustion engine runs, or by a load and engine speed with which the internal combustion engine run, wherein the reference NOx level is set as a ratio relative to a maximum attainable NOx deposition on the NOx absorber catalyst.

2. An exhaust gas purification system for an internal combustion engine according to claim 1 comprising:
   a engine speed detection sensor for detecting the engine speed of the internal combustion engine; and
   a load detection sensor for detecting a load of the internal combustion engine,
   wherein the NOx deposition calculating means calculates the amount of NOx deposited on the NOx adsorber catalyst, based on information provided by the engine speed detecting sensor and the load detection sensor.

3. An exhaust gas purification system for an internal combustion engine according to claim 1 comprising an air intake restricting means for restricting air inflow to a cylinder of the internal combustion engine,
   wherein the first air fuel ratio controlling means restricts air inflow to the cylinder of the internal combustion engine via the air intake restricting means, thereby altering the air fuel ratio of exhaust gas from the internal combustion engine close to stoichiometric air fuel ratio.

4. An exhaust gas purification system for an internal combustion engine according to claim 3 comprising:
   an operation monitoring means for monitoring the operation of the air intake restricting means; and
   a fuel supply correcting means for correcting the amount of fuel supply to a cylinder of the internal combustion engine, based on a signal from the operation monitoring means.

5. An exhaust gas purification system for an internal combustion engine equipped with an NOx adsorber catalyst which absorbs, for deposition, NOx when exhaust gas lean in its air fuel ratio flows in, and releases deposited NOx when the oxygen concentration of exhaust gas inflow is reduced, comprising:
   a NOx deposition calculating means for calculating the amount of NOx deposited on the NOx adsorber catalyst;
   a first air fuel ratio controlling means which, when the NOx deposition calculated by the NOx deposition calculating means reaches a predetermined reference level, alters an air fuel ratio of exhaust gas discharged from the internal combustion engine to come into contact with the NOx adsorber catalyst to stoichiometric air fuel ratio, so as to cause the NOx adsorber catalyst to release NOx deposited thereupon; and
   a reference NOx level setting means which sets a reference NOx level depending on a load with which the internal combustion engine runs, or on a load and engine speed with which the internal combustion engine runs,
   wherein the reference NOx level setting means sets a reference NOx level approximately equal to the maximum attainable NOx deposition on the NOx adsorber catalyst when the internal combustion engine runs in a high load range; and sets it below the maximum attainable NOx deposition on the NOx adsorber catalyst when the internal combustion engine runs in a low load range.

6. An exhaust gas purification system for an internal combustion engine according to claim 5 wherein the reference NOx level setting means sets a reference NOx level in accordance with a driving mode of the internal combustion engine, when the engine runs in a low load range.

7. An exhaust gas purification system for an internal combustion engine according to claim 6 comprising
   a second air fuel ratio controlling means which, as soon as the run of the internal combustion engine shifts from a high load range to a low load range, or from a high speed/high load range to a low speed/low load range, alters the air fuel ratio of exhaust gas from the internal combustion engine to come into contact with the NOx adsorber catalyst to stoichiometric air fuel ratio, so as to cause the NOx adsorber catalyst to release NOx deposited thereupon.

8. An exhaust gas purification system for an internal combustion engine according to claim 6 comprising an air intake restricting means for restricting air inflow to a cylinder of the internal combustion engine,
  wherein the first air fuel ratio controlling means restricts air inflow to the cylinder of the internal combustion engine via the air intake restricting means, thereby altering the air fuel ratio of exhaust gas from the internal combustion engine close to stoichiometric air fuel ratio.

9. An exhaust gas purification system for an internal combustion engine according to claim 5 wherein the reference NOx level setting means sets a reference NOx level at $1/3$ to $2/3$ of a maximum attainable NOx deposition on the NOx adsorber catalyst when the internal combustion engine runs in a low load range.

10. An exhaust gas purification system for an internal combustion engine equipped with an NOx adsorber catalyst which absorbs, for deposition, NOx when exhaust gas lean in its air fuel ratio flows in, and releases deposited NOx when the oxygen concentration of exhaust gas inflow is reduced, comprising:
  a NOx deposition calculating means for calculating the amount of NOx deposited on the NOx adsorber catalyst;
  a first air fuel ratio controlling means which, when the NOx deposition calculated by the NOx deposition calculating means reaches a predetermined reference level, alters an air fuel ratio of exhaust gas discharged from the internal combustion engine to come into contact with the NOx adsorber catalyst to stoichiometric air fuel ratio, so as to cause the NOx adsorber catalyst to release NOx deposited thereupon; and
  a reference NOx level setting means which sets a reference NOx level depending on a load with which the internal combustion engine runs, or on a load and engine speed with which the internal combustion engine runs,
  wherein the reference NOx level setting means sets a reference NOx level approximately equal to the maximum attainable NOx deposition on the NOx adsorber catalyst when the internal combustion engine runs in a high speed/high load range; and sets it below the maximum attainable NOx deposition on the NOx adsorber catalyst when the internal combustion engine runs in a low speed/low load range.

11. An exhaust gas purification system for an internal combustion engine according to claim 10 wherein the reference NOx level setting means sets a reference NOx level in accordance with a driving mode of the internal combustion engine, when the engine runs in a low speed/low load range.

12. An exhaust gas purification system for an internal combustion engine according to claim 11 comprising
  a second air fuel ratio controlling means which, as soon as the run of the internal combustion engine shifts from a high load range to a low load range, or from a high speed/high load range to a low speed/low load range, alters the air fuel ratio of exhaust gas from the internal combustion engine to come into contact with the NOx adsorber catalyst to stoichiometric air fuel ratio, so as to cause the NOx adsorber catalyst to release NOx deposited thereupon.

13. An exhaust gas purification system for an internal combustion engine according to claim 11 comprising an air intake restricting means for restricting air inflow to a cylinder of the internal combustion engine,
  wherein the first air fuel ratio controlling means restricts air inflow to the cylinder of the internal combustion engine via the air intake restricting means, thereby altering the air fuel ratio of exhaust gas from the internal combustion engine close to stoichiometric air fuel ratio.

14. An exhaust gas purification system for an internal combustion engine according to claim 10 wherein the reference NOx level setting means sets a reference NOx level at $1/3$ to $2/3$ of the maximum attainable NOx deposition on the NOx adsorber catalyst when the internal combustion engine runs in a low speed/low load range.

15. An exhaust gas purification system for an internal combustion engine equipped with an NOx adsorber catalyst which absorbs, for deposition, NOx when exhaust gas lean in its air fuel ratio flows in, and releases deposited NOx when the oxygen concentration of exhaust gas inflow is reduced, comprising:
  a NOx deposition calculating means for calculating the amount of NOx deposited on the NOx adsorber catalyst;
  a first air fuel ratio controlling means which, when the NOx deposition calculated by the NOx deposition calculating means reaches a predetermined reference level, alters an air fuel ratio of exhaust gas discharged from the internal combustion engine to come into contact with the NOx adsorber catalyst to stoichiometric air fuel ratio, so as to cause the NOx adsorber catalyst to release NOx deposited thereupon;
  a reference NOx level setting means which sets a reference NOx level depending on a load with which the internal combustion engine runs, or on a load and engine speed with which the internal combustion engine runs; and
  a second air fuel ratio controlling means which, as soon as the run of the internal combustion engine shifts from a high load range to a low load range, or from a high speed/high load range to a low speed/low load range, alters the air fuel ratio of exhaust gas from the internal combustion engine to come into contact with the NOx adsorber catalyst to stoichiometric air fuel ratio, so as to cause the NOx adsorber catalyst to release NOx deposited thereupon.

16. An exhaust gas purification system for an internal combustion engine according to claim 15 comprising an air intake restricting means for restricting air inflow to a cylinder of the internal combustion engine,
  wherein the second air fuel ratio controlling means restricts air inflow to the cylinder of the internal combustion engine via the air intake restricting means, thereby altering the air fuel ratio of exhaust gas from the internal combustion engine close to stoichiometric air fuel ratio.

17. An exhaust gas purification system for an internal combustion engine according to claim 16 comprising:
  an operation monitoring means for monitoring the operation of the air intake restricting means; and
  a fuel supply correcting means for correcting the amount of fuel supply to a cylinder of the internal combustion engine, based on a signal from the operation monitoring means.

18. An exhaust gas purification system for an internal combustion engine equipped with an NOx adsorber catalyst which absorbs, for deposition, NOx when exhaust gas lean in its air fuel ratio flows in, and releases deposited NOx when the oxygen concentration of exhaust gas inflow is reduced, and a super charger equipped with a compressor;

a NOx deposition calculating means for calculating the amount of NOx deposited on the NOx adsorber catalyst;

a first air fuel ratio controlling means which, when the NOx deposition calculated by the NOx deposition calculating means reaches a predetermined reference level, alters an air fuel ratio of exhaust gas discharged from the internal combustion engine to come into contact with the NOx adsorber catalyst to stoichiometric air fuel ratio, so as to cause the NOx adsorber catalyst to release NOx deposited thereupon; and a reference NOx level setting means which sets a reference NOx level depending on a load with which the internal combustion engine runs, or on a load and engine speed with which the internal combustion engine runs, wherein an air intake restricting means of the compressor is so configured as to be capable of discharging part of feed air at an outlet of the compressor of the super charger towards the downstream side of the NOx adsorber catalyst.

* * * * *